United States Patent

Fuchs et al.

[11] 4,066,638
[45] Jan. 3, 1978

[54] WATER-SOLUBLE FIBER REACTIVE PHENYL-AZO-NAPHTHYL DYESTUFFS CONTAINING TWO SULFO GROUPS IN THE PHENYL MOIETY

[75] Inventors: Hermann Fuchs, Kelkheim, Taunus; Gustav Kapaun, Neuenhain, Taunus; Fritz Meininger, Frankfurt am Main, all of Germany

[73] Assignee: Hoechst Aktiengesellschaft, Frankfurt am Main, Germany

[21] Appl. No.: 514,994

[22] Filed: Oct. 15, 1974

[30] Foreign Application Priority Data

Oct. 17, 1973 Germany .................. 2351970

[51] Int. Cl.² ............. C09B 62/74; D06P 1/384; D06P 3/10; D06P 3/66
[52] U.S. Cl. ........................ 260/196; 260/156; 260/163; 260/197; 260/198; 260/199; 260/200; 260/201; 260/205; 260/206; 260/207; 260/207.1; 260/207.5; 260/453 R; 260/458 C; 260/508
[58] Field of Search ............ 260/156, 162, 163, 196, 260/197, 198, 199, 200, 201, 205, 206, 207, 207.1

[56] References Cited

U.S. PATENT DOCUMENTS

| 2,657,205 | 10/1953 | Heyna et al. ............ 260/185 |
| 3,385,843 | 5/1968 | Remy et al. ............ 260/163 |
| 3,419,541 | 12/1968 | Kuhne et al. ............ 260/162 |
| 3,440,240 | 4/1969 | Kuhne et al. ............ 260/187 |
| 3,471,469 | 10/1969 | Meininger et al. ............ 260/163 |
| 3,553,189 | 1/1971 | Sugiyama et al. ............ 260/198 |
| 3,642,765 | 2/1972 | Cesterlein et al. ............ 260/153 |
| 3,859,271 | 1/1975 | Sugiyama et al. ............ 260/163 |

*Primary Examiner*—Floyd D. Higel
*Attorney, Agent, or Firm*—Curtis, Morris & Safford

[57] ABSTRACT

Fiber-reactive azo dyestuffs are obtained by diazotizng an amine of the formula

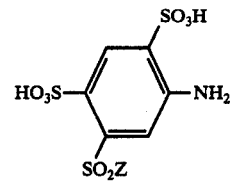

in which Z stands for —CH₂—CH₂—A or

—CH=CH₂ in which A is N,N-dialkylamino with 1 to 4 carbon atoms in each alkyl moiety or is the radical of a mono- or poly-basic acid capable of being split off by an alkaline agent and coupling it with an azo component of the formula

H-B, in which B is aniline, naphthol, naphthylamine, aminonaphthol, pyridone, aminopyridine, 1-phenyl-4-aminopyrazole or 1-phenyl-5-pyrazolone, unsubstituted or substituted on the aromatic and/or heterocyclic moieties by one to four groups selected from alkyl, alkoxy, oxalkyl, cyanoalkyl, aminoalkyl or alkoxyalkyl with 1 to 6 carbon atoms in each alkyl and alkoxy moiety, chlorine and bromine, sulfonic acid, vinylsulfonyl, carboxyl, acylamino and arylamino groups.

6 Claims, No Drawings

WATER-SOLUBLE FIBER REACTIVE PHENYL-AZO-NAPHTHYL DYESTUFFS CONTAINING TWO SULFO GROUPS IN THE PHENYL MOIETY

The present invention relates to new, water-soluble and fibre-reactive azo dyestuffs which, in the form of the free acid, correspond to the general formula (1)

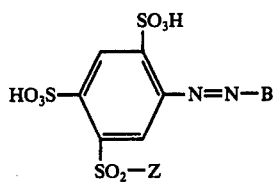

in which Z stands for a grouping of the formula $$-CH_2-CH_2-A \qquad (2)$$

or $$-CH=CH_2 \qquad (3)$$

in which A represents a N,N-dialkylamino group with 1 to 4 carbon atoms in the alkyl moieties or the ester radical of a mono- or poly-basic acid capable of being split off by an alkaline agent, such as sodium hydroxide or sodium carbonate B stands for a residue of a water-soluble or water-insoluble azo component of the aniline-, naphthol-, naphthylamine-, aminonaphthol, pyridone-, aminopyridine-, 1-phenyl-5-amino-pyrazole- or 1-phenyl-5-pyrazolone series, which can be substituted in the aromatic and/or heterocyclic ring, for example by alkyl, alkoxy, oxalkyl, cyanalkyl, aminoalkyl or alkoxyalkyl groups with 1 to 6 carbon atoms each in the alkyl and alkoxy moieties, or by chlorine or bromine atoms, cyano, sulfonic acid, vinylsulfonyl, β-sulfatoethylsulfonyl groups, acyl groups such as acetyl- or benzoyl groups, carboxyl groups, acylamino groups such as acetylamino, benzoylamino, methylbenzoylamino, chlorobenzoylamino or acetylaminobenzoylamino groups, arylamino groups such as phenylamino, tolylamino or naphthylamino groups.

The present invention also concerns a process for the preparation, of these novel dyestuffs characterized by diazotizing, in a generally known manner, a diazo component of the general formula (4)

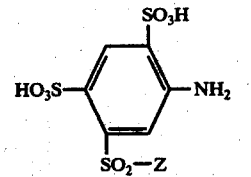

in which Z stands for a grouping of the beforementioned formulae (2) or (3) or for the β-hydroxyethyl group and coupling it with a coupling compound of the formula (5)

$$H-B \qquad (5)$$

in which B has the beforementioned signification, at temperatures between about 0° C and about 40° C and at pH values between 0 and 9, and, if the so-obtained dyestuff contains the β-hydroxyethyl group for Z, converting it by esterification with amidosulfonic acid in presence of an organic base such as pyridine or picoline, or with chlorosulfonic acid in N-methylpyrrolidone or with sulphuric acid into the corresponding sulphuric acid ester.

For A as a residue of a mono- or polybasic acid, the following radicals, for example, —Cl, —Br, —OSO₃H, —SSO₃H, —OPO₃H₂, —O—COCH₃ or —SO₂—CH₃ can be used.

Of particular importance are those dyestuffs of the general formula (1) in which Z stands for the β-sulfatoethylsulfone or the vinylsulfone group, as they are technically available in the simplest way via a corresponding diazo component.

As coupling compounds H-B may be used water-soluble compounds containing, for example, sulfonic acid groups or carboxylic acid groups, as well as water-insoluble compounds; also coupling compounds may be used which contain an azo group.

Of the new compounds of the formula (1), the dyestuffs of the formulae (6) to (12) are preferred

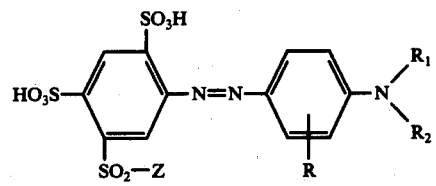

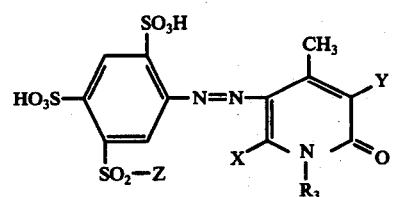

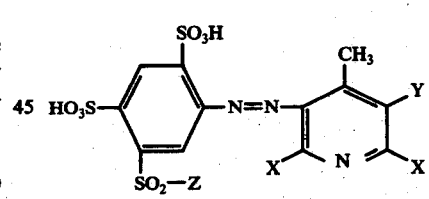

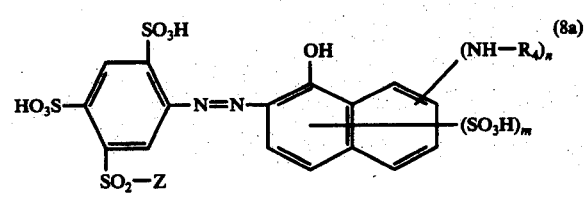

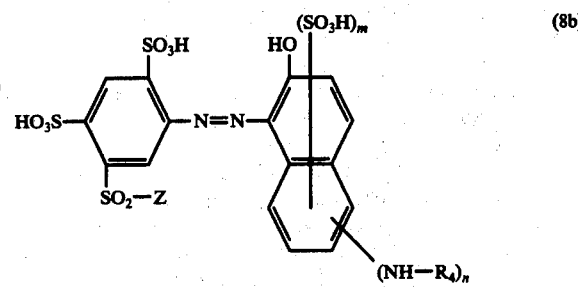

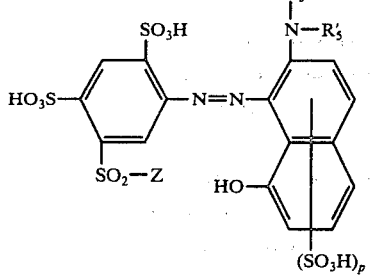 (9)

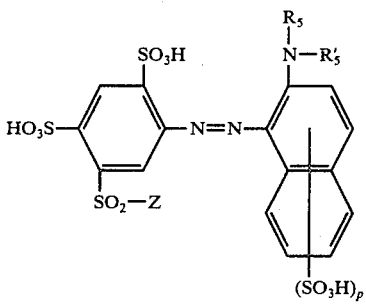 (10)

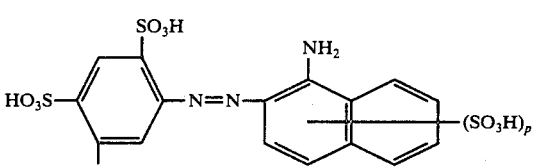 (10a)

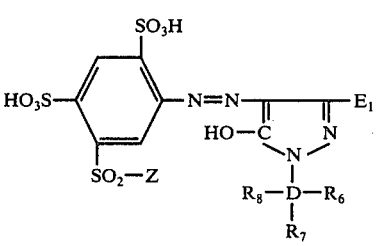 (11)

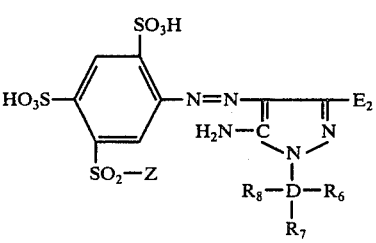 (12)

in which Z stands for the β-dimethylaminoethyl, β-diethylaminoethyl, β-chloroethyl, β-bromoethyl, β-sulfatoethyl, β-thiosulfatoethyl, β-phosphatoethyl, β-acetoxyethyl or vinyl group, preferably for the β-sulfatoethyl or the vinyl group, R represents a hydrogen atom, an alkyl radical with 1 to 4 carbon atoms, an alkoxy radical with 1 to 4 carbon atoms, the acetylamino group or chlorine or bromine, $R_1$ represents a hydrogen atom or an alkyl group with 1 to 4 carbon atoms which may be sustituted by a hydroxy or a cyano group, $R_2$ stands for a alkyl group with 1 to 4 carbon atoms which can be substituted by a hydroxy or a cyano group, of for the acetyl or benzoyl group, $R_3$ is an alkyl group with 1 to 4 carbon atoms or hydrogen, X represents the amino or hydroxy group, a monoalkyl or dialkylamino group with 1 to 4 carbon atoms each in the alkyl moiety, whereby the alkyl moiety may be substituted by an alkoxy radical with 1 to 4 carbon atoms, by a hydroxy or acetoxy group or a chlorine atom, Y stands for the cyano group or the sulfo group, $R_4$ represents a radical of the formula

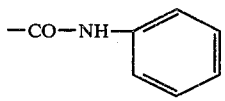

or the phenyl radical, which can be substituted by chlorine atoms, alkyl- and/or alkoxy groups with 1 to 4 carbon atoms each, or by the acetylamino group, or by an alkyl radical or an alkylcarbonyl or alkenylcarbonyl radical with 2 to 5 carbon atoms or by a benzoyl radical which may be substituted by chlorine, alkyl and/or alkoxy groups with 1 to 4 carbon atoms, or by the acetylamino group, $R_5$ represents a hydrogen atom or an alkyl radical with 1 to 4 carbon atoms, $R'_5$ represents a hydrogen atom, an alkyl radical with 1 to 4 carbon atoms or the phenyl radical which may be substituted by chlorine, alkyl and/or alkoxy groups with 1 to 4 carbon atoms each, $m$ represents the integers zero, 1, 2 or 3, $n$ represents the integer zero or 1, $p$ represents the integer zero, 1 or 2, $E_1$ and $E_2$ represent each an alkyl radical with 1 to 4 carbon atoms, the carboxy group, the carbonamide or a carbonyloxyalkyl radical with 2 to 5 carbon atoms, D represents the phenyl or naphthyl radical, $R_6$ stands for hydrogen, the sulfo-, the vinylsulfonyl or the β-sulfatoethylsulfonyl group or an alkyl group with 1 to 4 carbon atoms, $R_7$ stands for hydrogen, for the sulfo group, a bromine or a chlorine atom, an alkyl or an alkoxy group with 1 to 4 carbon atoms or for the acetyl-amino group, $R_8$ for hydrogen, the carboxy or carbonamide group or for chlorine or an alkyl or alkoxy group with 1 to 4 carbon atoms.

Of these compounds, those are preferred which correspond to the general formulae (6), (7a), (7b), (8a), (9), (10) and (12) in which the particular members of the formulae have the following significations:

Z stands for the β-sulfatoethyl, β-thiosulfatoethyl, β-chloroethyl or vinyl group, R stands for hydrogen or the methyl or ethyl group, $R_1$ stands for an alkyl group with 1 to 4 carbon atoms, preferably the methyl or ethyl group, the β-hydroxyethyl or β-cyanoethyl group, $R_2$ has the significance of $R_1$, whereby $R_2$ may be different from $R_1$, $R_3$ is a methyl or ethyl group or hydrogen, X is the hydroxy group or a monoalkylamino radical with 1 to 4 carbon atoms, whereby the alkyl moiety may be substituted by a methoxy, ethoxy or propoxy group, a hydroxy or an acetoxy group, Y stands for the cyano or sulfo group, $m$ is the integer 1 or 2, $n$ is zero, $p$ is the integer 1 or 2, $R_5$ is hydrogen, $R'_5$ represents the methyl or ethyl group or the phenyl radical which may be sutstituted by chlorine, methyl, ethyl, methoxy and/or ethoxy groups, $E_1$ represents the methyl or carboxy group or the carbonyloxymethyl or -ethyl group, $E_2$ represents the methyl group, D represents the phenyl radical, $R_6$ represents the sulfo, vinylsulfonyl, β-sulfatoethylsulfonyl or methyl group, $R_7$ represents hydrogen, the sulfo group, the methyl, methoxy or ethoxy group or chlorine, and $R_8$ is hydrogen, chlorine or the methyl, methoxy or ethoxy group.

Amongst the important number of the coupling compounds which can be used for the preparation of the new dyestuffs, for example, the following ones are preferred:

The N-mono- and N-dimethyl- as well as the N-mono- and N-diethyl compounds of aniline, o-toluidine, m-toluidine and m-chloraniline, the N-mono- and N-di-β-hydroxethyl compounds of aniline and m-toluidine, N-ethyl-N-β-cyanoethylaniline and -m-toluidine, N-ethyl-N-β-hydroxethylaniline and -m-toluidine, N-ethyl-N-β-cyanoethyl-2-methoxy-5-acetylamino-aniline, N-ethyl-N-β-cyanoethyl-2,5-dimethoxy-aniline, N-diethyl-2-methoxy-5-methylaniline, m-toluidine and m-anisidine.

Dyestuffs of the invention which contain for example m-toluidine or m-anisidine as coupling component, can afterwards by acylized in known manner with a carboxylic acid halide or anhydride.

Furthermore, the following coupling components may be cited as to be preferably suitable for the preparation of the novel dyestuffs.

3-cyano-4-methyl-6-hydroxy-pyridone(2), 3-cyano-1,4-dimethyl-6-hydroxy-pyridone(2), 4-methyl-6-hydroxy-pyridone(2)-3-sulfonic acid 1,4-dimethyl-6-hydroxy-pyridone(2)-3-sulfonic acid, 2,6-diamino-3-cyano-4-methylpyridino 2,6-tris-(monomethylamino)-3-cyano-4-methyl-pyridine 2,6-bis(-β-hydroxyethylamino)-3-cyano-4-methylpyridine, 2,6-bis(-β-hydroxyethylamino)-3-cyano-4-methylpyridine, 2,6-bis(γ-methoxypropylamine)-3-cyano-4-methylpyridine, 2-naphthol, 1-naphthol-4-sulfonic acid, 2-naphthol-6-sulfonic acid, 2naphthol-7-sulfonic acid, 2-naphthol-8-sulfonic acid, 2-naphthol-3,6-disulfonic acid, 2-naphthol-6,8-disulfonic acid, 1-naphthylamine-4,6- and 4,7-disulfonic acid, 1-naphthylamine-4,8-disulfonic acid, 1-naphthyl-amine-3,6- and -5,7-disulfonic acid, 2-naphthylamine-1-sulfonic acid, 2-naphthylamine-5- and -6-sulfonic acid, 2-N-methylaminonaphthalene-6- and -7-sulfonic acid, 1-phenylamino-napthtalene-8-sulfonic acid, 2-naphthylamino-3,6- and -3,7-disulfonic acid, 2-naphthylamine-6,8-disulfonic acid, 2-naphthylamine-5,7-disulfonic acid, 2-amino-8-naphthol-6-sulfonic acid, 2-N-methylamino-8-naphthol-6-sulfonic acid, 2-phenylamino-S-naphthol-6-sulfonic acid, 2p-tolylamino-8-naphthol-6-sulfonic acid, 2-amino-8-naphthol-5-sulfonic acid, 2-benzoylamino-8-naphthol-6-sulfonic acid, 2-benzoylamino-5-naphthol-7-sulfonic acid.

1-acetylamino-8-naphthol-3,6-disulfonic acid, 1-benzoylamino-8-naphthol-3,6-disulfonic acid 1-(3'-chlorobenzoyl-amino)-8-naphthol-3,6-disulfonic acid, 1-(3'-acetaminobenzoylamino)-8-naphthol-3,6-disulfonic acid, 1-(4'-acetaminobenzoylamino)-8-naphthol-3,6-disulfonic acid, 1-acetylamino-8-naphthol-4,6-disulfonic acid, 1-benzoyl-amino-S-naphthol-4,6-disulfonic acid, 1-(3'-chlorobenzoylamino)-8-naphthol-4,6-disulfonic acid, 1-(3'-acetaminobenzoylamino)-8-naphthol-4,6-disulfonic acid, 1-(4'-acetaminobenzoylamino)-8-naphthol-4,6-disulfonic acid, N-phenyl-N'-8-oxy-3,6-disulfonaphthyl urea, N-phenyl-N'-S-oxy-4,6-disulfonaphthyl urea, 1-phenyl-3-methyl-5-aminopyrauole, 1-(4'-sulfophenyl)-3-methyl-5-amino pyrazole, 1-(4'-β-sulfatoethylsulfonylphenyl)-3-methyl-5-amino-pyrazole, 1-(2'-methoxy-5'-sulfatoethylsulfonylphenyl)-3-methyl-5-aminopyratole, 1-(4'-methoxyphenyl)-3-aminopyrazole, 1-(2',5'-dichloro-4'-sulfophenyl)-3-methyl-5-aminopyrazole, 1-(4'-sulfophenyl)-3-carboxy-pyrazolone (5), 1-(2'-chloro-5'-sulfophenyl)-3-methyl-pyrazole (5), 1-(2'-chloro-6'-methyl-4'-sulfophenyl)-3-methylpyrazolone (5), 1-(4'-sulfophenyl-3-methyl-pyrazolone (5) and 1-(2'-chloro-6'-methylphenyl)-3-methyl-pyrazolone (5).

For the isolation of the dyestuffs prepared according to the invention, the pH value of the dyestuff solutions or suspensions is adjusted to 5.5 to 7.5, for example, with an alkali metal hydroxide, alkali metal carbonate or with an acid, and the dyestuffs are separated by salting out with alkali metal chlorides, such as sodium or potassium chloride, or by spray-drying of the aqueous solutions.

The starting compounds of the general formula

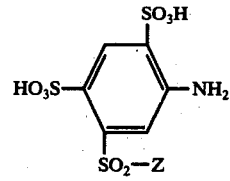

in which Z stands for the vinyl or β-sulfatoethyl group used for the preparation of the new compounds, may be prepared by dissolving or suspending 1-aminobenzene-3-β-sulfatoethylsulfone or 1-aminobenzene-3-β-hydroxyethyl-sulfone either (a) in an anhydrous sulfuric acid (monohydrate) between about −15° C and + 135° C, advantageously between about −15° C and +40° C, preferably between about 10° C and 20° C, adding afterwards sulphur trioxide dissolved in anhydrous sulphuric acid, preferably a sulphuric acid/sulphur trioxide mixture in a ratio of 30 : 70 to 90 : 10, in the above-mentioned range of temperature, or (b) by pouring 1-aminobenzene-3-β-sulfatoethylsulfone or 1-aminobenzene-3-β-hydroxyethyl-sulfone immediately into a mixture of sulphuric acid/sulphur trioxide having a content of up to 30 percent by weight of sulphur trioxide, and subsequently heating it to a temperature in the range of about 100° C to about 150° C, preferably to 125° C – 135° C. The 1-aminobenzene-5-β-sulfatoethylsulfone-2,4-disulfonic acid obtained may be converted into the vinyl compound by heating it in an aqueous solution at 2.5 – 7 to about 30° C to about 100° C, advantageously to about 30° C to 60° C, in the course of which the sulphuric acid thereby split off is neutralized by adding an acid-binding agent; the 1-aminobenzene-5-vinylsulfone-2,4-disulfonic acid obtained is isolated in form of an alkali metal or alkaline earth metal salt.

The corresponding dialkylaminoethylsulfonyl and β-thiosulfatoethyl-sulfonyl compounds may be obtained in an analogous way as known in the art for similar compounds, from the vinylsulfonyl compound by reaction with the corresponding dialkylamine or an alkali metal thiosulfate.

The other starting amines of the formula (4), in which A stands for the radical of an other mono- ou polybasic acid, are prepared in an analogous way to known esterification processes of the β-hydroxy-ethylsulfonyl group with the aid of corresponding esterification agents such as, for example, thionylchloride, phosphoroxychloride, concentrated phosphoric acid acetanhydride or glacial acetic acid by esterification of 1-amino-2,4-disulfo-5-β-hydroxyethylsulfonylbenzene which is obtained by alkaline treatment of the corresponding abovementioned β-sulfato compound.

The azo dyestuffs of the invention are especially suitable for dyeing and printing of native or regenerated cellulose fibres such as cotton, linen or viscose rayon. They can preferably be employed in accordance with dyeing and printing processes for reactive dyestuffs which are known and generally customary in industry by applying them on the beforementioned fibres with the aid of an acid-binding agent such as sodium or potassium hydroxide, sodium or potassium carbonate, disodium hydrogen phosphate, sodium hydrogeno carbonate or water glass. The acid-binding agent can be applied before, during or after the application of the dyestuffs on the fibre materials, or the textile material can be treated before, during or after the application of the dyestuffs with these agents. Fixation is carried out at normal or at elevated temperature. Furthermore, these new dyestuffs are suitable for dyeing and printing of materials containing or consisting of nitrogen-containing fibres of natural or synthetic provenience, for example of silk, wool, synthetic polyamide or polyurethane fibres. As far as the beforementioned nitrogen-containg fibres are concerned, the new dyestuffs are especially suitable for the dyeing of wool. For the purpose of dyeing wool or synthetic polyamide fibres, the new dyestuffs are applied in a neutral, but preferably in a weakly acid dyebath having a constant or practically constant pH value. The dyeing is effected preferably at temperatures between 40° C and 120° C in the presence of compounds which are customary for the dyeing of nitrogen containing textile materials such as, for example, sodium sulfate, ammonium acetate, surface-active compounds such as quaternary ammonium salts and non-ionic wetting and dispersing agents. Especially the addition of β-N-methylaminoethane-sulfonic acid sodium salt has proved to be very suitable for the levelness of the so-obtained dyeings. The pH value of the dyebath can be altered during the dyeing process by adding acids or acid salts, respectively alkalis or alkaline salts, for example in this way that the dyeing process starts at pH 4.5 and is increased to 7.5 during the dyeing process.

The azo dyestuffs of the invention yield on native and regenerated cellulose fibre materials dyeings with very good fastnesses to washing and to light. For nitrogen-containing natural or synthetic fibres such as wool, polyamides or polyurethanes they have an excellent affinity.

The dyeings executed with the dyestuffs of the invention present good to very good fastness to light and excell by their very good fastnesses to wet processing, especially to washing at a temperature of up to 95° C, fulling and decatizing.

The new azo dyestuffs, especially if compared with structurally similar azo dyestuffs, which, in the diazo component, do not contain sulfonic acid groups in o- and p- position to the azo group, excell by a very good, respectively better solubility in weakly acid and especially in alkaline aqueous dyebath or printing pastes and a very good, respectively better washing-off capacity of the unfixed dyestuff portions of the fiber and especially by clearer shades and very good, respectively better fastnesses to washing and to rubbing.

Compared with structurally similar dyestuffs containing the non-sulfonated diazo component 1-aminobenzene-3-β-sulfatoethylsulfone, the dyestuffs of the invention differ from those by a strongly bathochrome shift of the shades. Thereby dyestuffs are obtainable showing shades which may otherwise be obtained only with difficulty.

Owing to the substitution of the benzene nucleus with sulfonic acid group in o- and p-position, the vinylsulfone group, which can be formed from the grouping $-SO_2-CH_2-CH_2-A$ by treatment with an alkaline agent, has a higher reactivity against hydroxyl, thiol and amino groups. This higher reactivity is surprising and was not previsible. Dyestuffs of the formula (1) are therefore especially suitable for rapid fixation and low-temperature processes for dyeing and printing of cellulose fibre materials, whereby, in comparison with known dyestuffs in which the reactive group is the vinyl-sulfone group, the usuel dyestuffs are usable in the dyeing processes with a clearly shorter time for fixation, even at low fixation temperatures at which only a short time for fixation with very high fixation rates is also present.

Also when dyeing wool according to low-temperature dyeing processes, for example at 80° C, a miximum of fixation on the fibre is obtained, whilst the known comparable vinylsulfone dyestuffs present optimal fixation rates only at temperatures from 95° C to 100° C within the prescribed dyeing time.

Furthermore, the new dyestuffs are very well suitable for combination with one another as well as with different dyestuffs.

The following examples illustrate the invention.

EXAMPLE 1

0.1 mole of 1-aminobenzene-5-vinylsulfone-2,4-disulfonic acid were dissolved in 150 ml of water; 50 g of ice and 25 g of a 37% hydrochloric acid were added, and the amino compound was diazotized by adding dropwise 20 ml of 5N-sodium nitrite solution whilst stirring. After 15 minutes the little excess of nitrous acid was destroyed with some amidosulfonic acid. The diazonium salt partially precipitated. To this suspension 0.1 mol of 2-amino-8-naphthol-6-sulfonic acid was added.

After about 2 hours at a temperature between 15° C – 20° C the coupling was completed. The pH value of the dyestuff solution was adjusted with sodium carbonate to 6.5 and the dyestuff was salted out with a 25% potassium chloride. After a 6 hours' stirring the dyestuff was suction filtered and dried. The dyestuff yielded on wool in a weakly acetic acid dyebath at 80° C, clear bluish red dyeings of very good fastness properties to alkaline perspiration and to light.

When printing cotton or spun rayon fabrics in the presence of an alkaline agent, already 1 minute after the fixation time a fully developed red print with very good fastness to wet processing and to light is obtained.

The so-obtained dyestuff corresponds, in the form of the free acid, to the formula

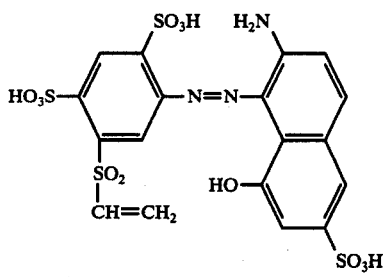

EXAMPLE 2

0.1 mol of 1-aminobenzene-5-vinylsulfone-2,4-disulfonic acid were dissolved in 150 ml of water. 50 g of ice and 25 g of a 37% hydrochloric acid were added, and the amino compound was diazotized by adding dropwise 20 ml of 5N-sodium nitrite solution whilst stirring. After 15 minutes the little excess of nitrous acid was destroyed with some amidosulfonic acid. The diazonium salt partially precipitated. To this suspension 0.1 mole of N-ethyl-N-β-cyano-ethyl-m-toluidine dissolved in 200 ml of water and 10 g of a 37% hydrochloric acid, were added; the pH value was adjusted to 1.5 to 1.8 by means of sodium carbonate. The coupling reaction was completed after 10 hours. The precipitated dyestuff was dissolved by neutralization to pH 6.5 with sodium carbonate, clarified and precipitated by adding 15% potassium chloride. After drying a light-brown powder was obtained which yielded on wool treated in a weakly acetic acid dyeing bath at 80° C, very good red-brown dyeings having very good fastnesses to wet processing.

The so-obtained dyestuff corresponds, in the form of the free acid, to the formula

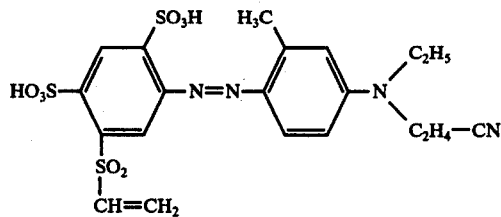

EXAMPLE 3

0.1 mol of 1-aminobenzene-5-vinylsulfone-2,4-disulfonic acid were dissolved in 150 ml of water; 50 g of ice and 25 g of a 37% hydrochloric acid were added and the amino compound was diazotized by adding dropwise 20 ml of 5N-sodium nitrite solution while stirring. After 15 minutes the little excess of nitrous acid was destroyed with some amidosulfonic acid. The diazonium salt partially precipitated. 0.1 mol of 2-naphthylamine-5-sulfonic acid were added to the suspension. By adding sodium carbonate the pH value was adjusted to 2.5 to 3.0. After coupling was completed, the solution was neutralized with calcinated soda up to a pH value of 5.5 to 6.5, and the dyestuff was salted out at 0° C to 5° C with 28% sodiumchloride. After filtration and drying a dark-red powder was obtained which yielded on wool treated in a weakly acetic acid bath of 80° C a red dyeing with very good fastnesses to wet processing and to light. When dyeing cotton according to a short-dwell pad method in the presence of an alkaline agent, a fully developed dyeing with good fastness to light and very good fastnesses to wet processing was obtained already within 1 to 5 minutes.

This dyestuff so obtained corresponds, in the form of the free acid, to the formula

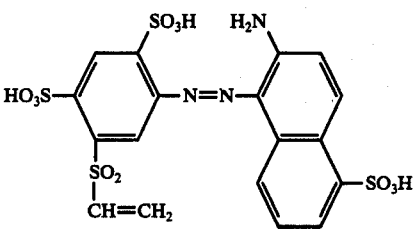

When the process was effected as indicated in any one of the Examples 1 to 3 but taking as diazo component the compounds shown in column I and as azo component those shown in column 2 of the following table valuable water-soluble azo dyestuffs were also obtained.

| No. | (I) Diazo component I | (II) Azo component II | shade on cotton |
|---|---|---|---|
| 4 | ![NH2, HO3S, SO2-CH2-CH2-O-SO3H, SO3H] | ![HO, HO3S, NH2 naphthalene] | red bluish |
| 5 | ![NH2, HO3S, SO2-CH2-CH2-O-PO3H2, SO3H] | " | red bluish |

-continued

| No. | (I) Diazo component I | (II) Azo component II | shade on cotton |
|---|---|---|---|
| 6 | 4-amino-2,5-disulfo-phenyl-SO₂—CH₂—CH₂—Cl | " | red bluish |
| 7 | 4-amino-2,5-disulfo-phenyl-SO₂—CH₂—CH₂—Br | " | red bluish |
| 8 | 4-amino-2,5-disulfo-phenyl-SO₂—CH₂—CH₂—S—SO₃H | " | red bluish |
| 9 | 4-amino-2,5-disulfo-phenyl-SO₂—CH₂—CH₂—SO₂CH₃ | " | red bluish |
| 10 | 4-amino-2,5-disulfo-phenyl-SO₂—CH₂—CH₂—OCOCH₃ | " | red bluish |
| 11 | 4-amino-2,5-disulfo-phenyl-SO₂—CH₂—CH₂—N(CH₃)₂ | " | red bluish |
| 12 | 4-amino-2,5-disulfo-phenyl-SO₂—CH₂—CH₂—N(C₂H₅)₂ | " | red bluish |
| 13 | 4-amino-2,5-disulfo-phenyl-SO₂—CH=CH₂ | N-methylaniline | yellow |
| 14 | " | N,N-dimethylaniline | yellow |
| 15 | " | N-ethylaniline | yellow |

Note: The diazo components in entries 6–13 are all 4-amino-2,5-disulfophenyl derivatives with different SO₂-substituents as indicated. Entries 14 and 15 use the same diazo component as entry 13 (shown by ").

-continued

| No. | (I) Diazo component I | (II) Azo component II | shade on cotton |
|---|---|---|---|
| 16 | " | 4-(N(C₂H₅)₂)-phenyl | yellow |
| 17 | " | 2-methyl-4-(NHCH₃)-phenyl | yellow |
| 18 | " | 2-methyl-4-(N(CH₃)₂)-phenyl | yellow |
| 19 | " | 2-methyl-4-(NHC₂H₅)-phenyl | yellow |
| 20 | " | 2-methyl-4-(N(C₂H₅)₂)-phenyl | yellow |
| 21 | " | 3-methyl-4-(NHCH₃)-phenyl | yellow brown |
| 22 | " | 3-methyl-4-(N(CH₃)₂)-phenyl | yellow brown |
| 23 | " | 3-methyl-4-(NHC₂H₅)-phenyl | yellow brown |
| 24 | " | 3-methyl-4-(N(C₂H₅)₂)-phenyl | yellow brown |
| 25 | " | 3-chloro-4-(NHCH₃)-phenyl | yellow |
| 26 | " | 3-chloro-4-(N(CH₃)₂)-phenyl | yellow |
| 27 | " | 3-chloro-4-(NHC₂H₅)-phenyl | yellow |
| 28 | " | 3-chloro-4-(N(C₂H₅)₂)-phenyl | yellow |

-continued

| No. | (I) Diazo component I | (II) Azo component II | shade on cotton |
|---|---|---|---|
| 29 | " | 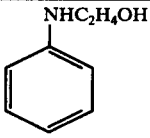 NHC₂H₄OH (on phenyl) | yellow |
| 30 | " | 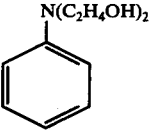 N(C₂H₄OH)₂ (on phenyl) | yellow |
| 31 | " | 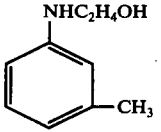 NHC₂H₄OH, CH₃ | yellow brown |
| 32 | " | 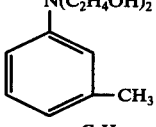 N(C₂H₄OH)₂, CH₃ | yellow brown |
| 33 | " | 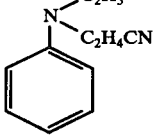 N(C₂H₅)(C₂H₄CN) on phenyl | red brown |
| 34 | " | 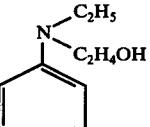 N(C₂H₅)(C₂H₄OH) on phenyl | red brown |
| 35 | " | 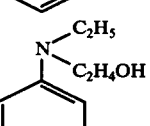 N(C₂H₅)(C₂H₄OH), CH₃ | red brown |
| 36 | " | 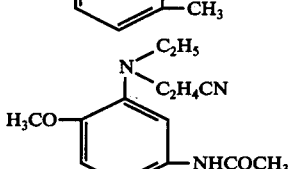 H₃CO-, N(C₂H₅)(C₂H₄CN), NHCOCH₃ | red brown |
| 37 | " | 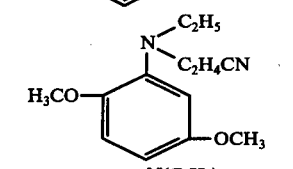 H₃CO-, N(C₂H₅)(C₂H₄CN), OCH₃ | red brown |
| 38 | " | 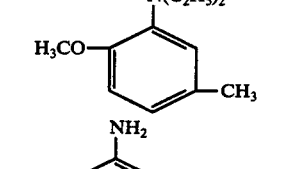 H₃CO-, N(C₂H₅)₂, CH₃ | red brown |
| 39 | " | 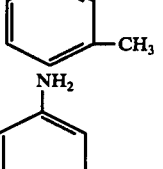 NH₂, CH₃ | yellow brown |
| 40 | " |  NH₂, OCH₃ | yellow brown |

-continued

| No. | (I) Diazo component I | (II) Azo component II | shade on cotton |
|---|---|---|---|
| 41 | " | [structure: 4-methyl-3-cyano-6-hydroxy-2-pyridone] | yellow |
| 42 | " | [structure: 4-methyl-3-cyano-6-hydroxy-N-methyl-2-pyridone] | yellow brown |
| 43 | " | [structure: 4-methyl-3-sulfo-6-hydroxy-2-pyridone] | yellow |
| 44 | " | [structure: 4-methyl-3-sulfo-6-hydroxy-N-methyl-2-pyridone] | yellow |
| 45 | " | [structure: 2-naphthol] | orange |
| 46 | " | [structure: 1-hydroxy-4-sulfo-naphthalene] | red yellowish |
| 47 | " | [structure: 6-sulfo-2-naphthol] | orange |
| 48 | " | [structure: 7-sulfo-2-naphthol] | orange |
| 49 | " | [structure: 1-sulfo-2-naphthol] | yellow |
| 50 | " | [structure: 3-hydroxy-2,7-disulfo-naphthalene] | orange |
| 51 | " | [structure: 2-hydroxy-5,7-disulfo-naphthalene (HO₃S at 5,7; OH at 2)] | orange |
| 52 | " | [structure: 2-amino-1-sulfo-naphthalene] | red bluish |

-continued

| No. | (I) Diazo component I | (II) Azo component II | shade on cotton |
|---|---|---|---|
| 53 | " | 4-amino-naphthalene-2,6-disulfonic acid (NH₂ at 4, HO₃S at 6 and 2-SO₃H) | red |
| 54 | " | 6-amino-naphthalene-2-sulfonic acid (HO₃S—naphthalene—NH₂) | red |
| 55 | " | 6-methylamino-naphthalene-2-sulfonic acid (HO₃S—naphthalene—NHCH₃) | red bluish |
| 56 | " | 7-methylamino-naphthalene-3-sulfonic acid (HO₃S—naphthalene—NHCH₃) | red bluish |
| 57 | " | 8-phenylamino-naphthalene-1-sulfonic acid (HO₃S, HN—phenyl) | yellow brown |
| 58 | " | 3-amino-naphthalene-2,6-disulfonic acid (HO₃S—naphthalene—NH₂, SO₃H) | red |
| 59 | " | 3-amino-naphthalene-2,7-disulfonic acid (HO₃S—naphthalene—NH₂, SO₃H) | red |
| 60 | " | 7-amino-naphthalene-1,3-disulfonic acid (HO₃S, HO₃S—naphthalene—NH₂) | red |
| 61 | " | 8-hydroxy-7-methylamino-naphthalene-3-sulfonic acid (OH, HO₃S—naphthalene—NHCH₃) | violet |
| 62 | " | 8-hydroxy-7-phenylamino-naphthalene-3-sulfonic acid (OH, HO₃S—naphthalene—NH—phenyl) | violet |
| 63 | " | 8-hydroxy-7-(4-methylphenylamino)-naphthalene-3-sulfonic acid (OH, HO₃S—naphthalene—NH—C₆H₄—CH₃) | violet |
| 64 | " | 8-hydroxy-7-amino-naphthalene-3-sulfonic acid (OH—naphthalene—NH₂, SO₃H) | red |

| No. | (I) Diazo component I | (II) Azo component II | shade on cotton |
|---|---|---|---|
| 65 | " | 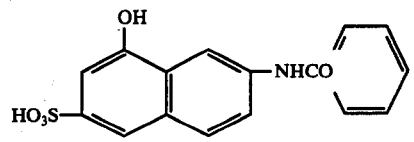 | red brown |
| 66 | " | 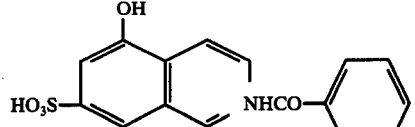 | red brown |
| 67 | " | 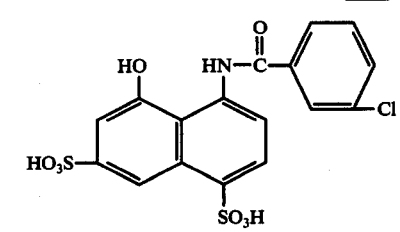 | red |
| 68 | " | 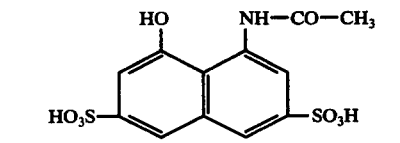 | red |
| 69 | " | 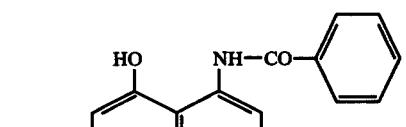 | red |
| 70 | " | 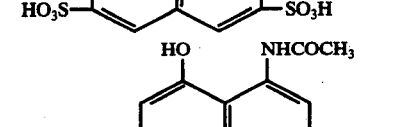 | red |
| 71 | " | 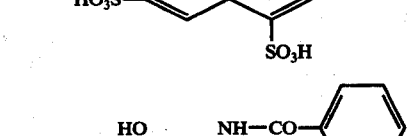 | red |
| 72 | " | 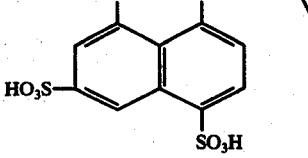 | yellow |
| 73 | " | 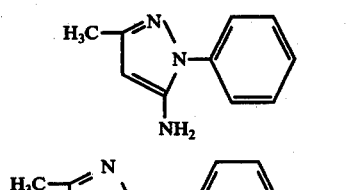 | yellow |
| 74 | " | 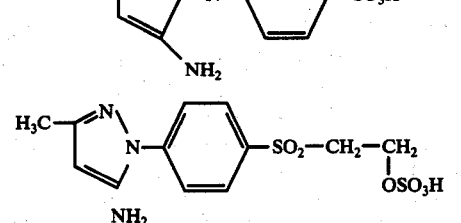 | yellow |

-continued

| No. | (I) Diazo component I | (II) Azo component II | shade on cotton |
|---|---|---|---|
| 75 | " | 3-(3-methyl-5-amino-pyrazol-1-yl)phenyl-SO₂—CH₂—CH₂—OSO₃H derivative with H₃CO substituent | yellow |
| 76 | " | 1-(4-methoxyphenyl)-3-methyl-5-amino-pyrazole | yellow |
| 77 | " | 1-(2,5-dichloro-4-sulfophenyl)-3-methyl-5-amino-pyrazole | yellow |
| 78 | " | 1-(4-sulfophenyl)-3-carboxy-5-pyrazolone | yellow |
| 79 | " | 1-(2,5-dichloro-4-sulfophenyl)-3-methyl-5-pyrazolone | yellow |
| 80 | " | 1-(2-chloro-4-sulfophenyl)-3-methyl-5-pyrazolone | yellow |
| 81 | " | 1-(2-chloro-4-sulfo-6-methylphenyl)-3-methyl-5-pyrazolone | yellow |
| 82 | " | 1-(4-sulfophenyl)-3-methyl-5-pyrazolone | yellow |
| 83 | " | 1-(2-chloro-6-methylphenyl)-3-methyl-5-pyrazolone | yellow |

EXAMPLE 84

0.1 mol of 1-aminobenzene-5-vinylsulfone-2,4-disulfonic acid were dissolved in 150 ml of water; 50 g of ice and 25 g of a 37% hydrochloric acid were added, and the amino compound was diazotized by adding dropwise 20 ml of 5N-sodium nitrite solution whilst stirring. After 15 minutes the little excess of nitrous acid was destroyed with some amidosulfonic acid. The diazonium salt partially precipitated. 0.1 mol of 2,6-bis-(γ-methoxy-propylamino)-3-cyano-4-methyl-pyridine were added to the suspension. Thereafter, the pH value of the coupling suspension was adjusted to 6.5 by means of sodium carbonate. The coupling was completed at a temperature of 15° C to 20° C after about 1 hour. Subsequently the dyestuff was salted out with 20% sodium chloride. The dyestuff was separated by filtration and dried. It yielded on wool in a weakly acetic acid dyebath at 80° C a yellowish orange-colored dyeing. Cotton and cell-wool fabrics could be dyed according to the exhaustion or pad short-dwell method in a clear yellowish orange color. These dyeings excell by their very good fastnesses to light and to wet processing and by their good fastness to chlorine.

The obtained dyestuff corresponds, in the form of the free acid, to the formula

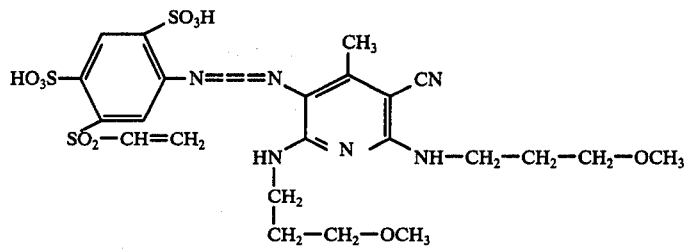

EXAMPLE 85

0.1 mol of 1-aminobenzene-5-vinylsulfone-2,4-disulfonic acid were dissolved in 150 ml of water; 50 g of ice and 25 g of a 37% hydrochloric acid were added, and the amino compound was diazotized by adding dropwise 20 ml of 5N-sodium nitrite solution whilst stirring. After 15 minutes the little excess of nitrous acid was destroyed with some amidosulfonic acid. The diazonium salt partially precipitated. 0.1 mol of 2,6-bis(-monomethylamino)-3-cyano-4-methylpyridine were added to the suspension and the pH value of the coupling suspension was adjusted to 6 by means of sodium carbonate.

The coupling was completed at a temperature of 15° C to 20° C after about 2 hours. The dyestuff precipitated in the course of the coupling process and was then suction-filtered and dried. On wool and cotton yellowish orange dyeings with clear shades were obtained. The dyeings on wool possess very good fastnesses to light and to wet processing and a good fastness to chlorine.

The dyestuff obtained corresponds, in the form of the free acid, to the formula

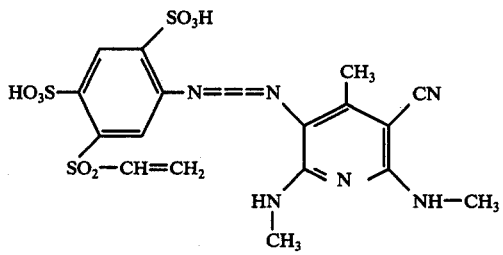

EXAMPLE 86

0.1 mol of 1-aminobenzene-5-vinylsulfone-2,4-disulfonic acid were diazotized as described in the foregoing Examples. 0.1 mol of m-toluidine dissolved in 200 ml of a 7% hydrochloric acid were added to the suspension and the coupling was completed at a temperature of 15° C after about 12 hours. The pH value of the dyestuff solution was adjusted to 6.5 with sodium carbonate. The dyestuff solution was cooled to 5° C, and 0.11 mol of acetanhydride were added dropwise whereby the pH value was maintained at 6 by adding a 10% sodium hydroxide solution. Stirring was continued during 2 hours. The dyestuff solution was then clarified and spray-dried. A brown powder was obtained which yielded on wool and cotton yellow dyeings with very good fastnesses to wet processing. In the form of the free acid, the dyestuff corresponds to the formula

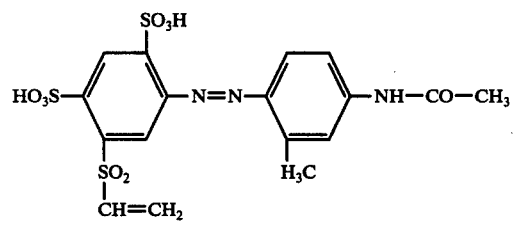

We claim:
1. A compound which, in the form of the free acid, corresponds to the formula

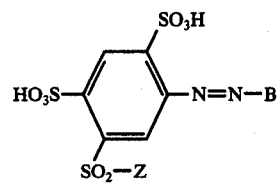

in which Z is

—CH$_2$-CH$_2$-A or

—CH=CH$_2$ in which A is Cl, Br, OSO$_3$H, SSO$_3$H, OPO$_3$H$_2$, O-COCH$_3$ or SO$_2$-CH$_3$, B is naphthol, naphthylamine or aminonaphthol, unsubstituted or substituted on the aromatic moieties by one to four groups selected from alkyl, alkoxy, oxalkyl, cyanoalkyl, aminoalkyl or alkoxyalkyl, each alkyl and alkoxy moiety having 1 to 6 carbon atoms, or with chlorine, bromine, sulfonic acid, vinylsulfonyl, carboxyl, acylamino or arylamino groups.

2. A compound as claimed in claim 1, in which B is

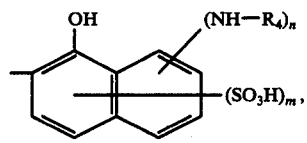

-continued

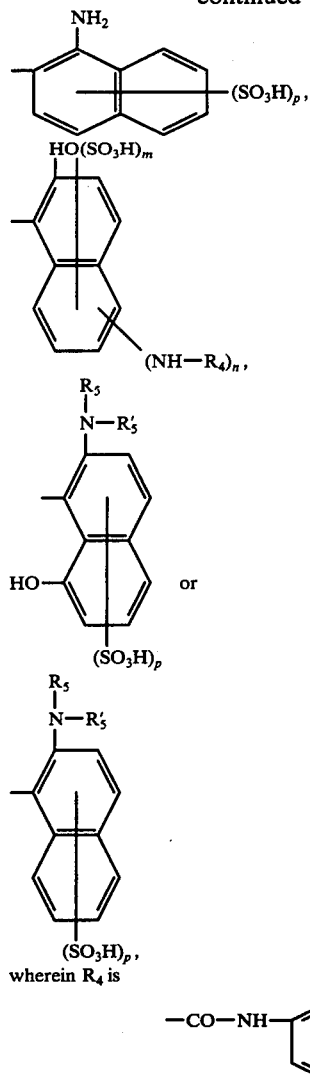

wherein $R_4$ is

—CO—NH—C₆H₅ or phenyl unsubstituted or substituted by chlorine, alkyl or alkoxy with 1 to 4 carbon atoms each, or by acetylamino, or $R_4$ is alkyl or alkylcarbonyl or alkenylcarbonyl each with 2 to 5 carbon atoms, or $R_4$ is benzoyl unsubstituted or substituted by chlorine, alkyl or alkoxy with 1 to 4 carbon atoms each, or by acetylamino, $R_5$ is hydrogen or alkyl with 1 to 4 carbon atoms, $R'_5$ is hydrogen, alkyl with 1 to 4 carbon atoms or phenyl unsubstituted or substituted by chlorine, alkyl or alkoxy with
1 to 4 carbon atoms each,
$m$ is zero, 1, 2 or 3, and
$p$ is zero, 1 or 2.

3. A compound as claimed in claim 1 of the formula

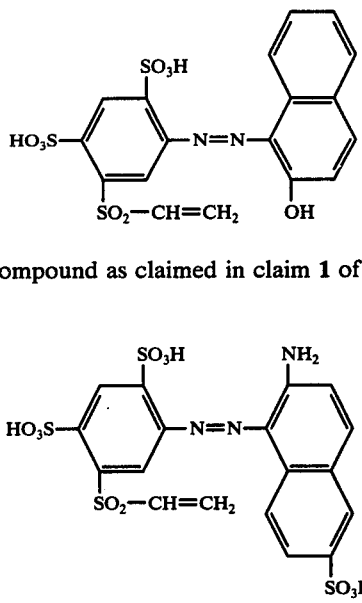

4. A compound as claimed in claim 1 of the formula

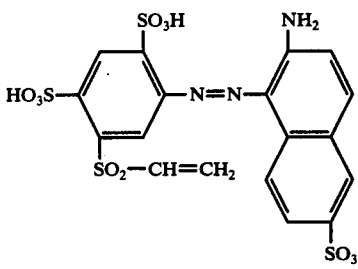

5. A compound as claimed in claim 1 of the formula

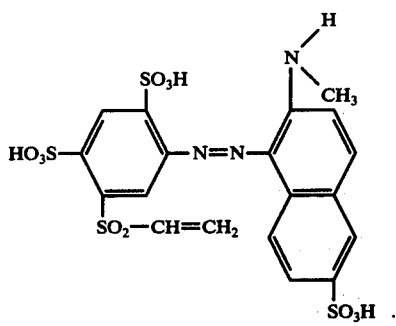

6. A compound as claimed in claim 1 of the formula

* * * * *